(12) United States Patent
Ozaki et al.

(10) Patent No.: US 11,319,825 B2
(45) Date of Patent: May 3, 2022

(54) SEALING DEVICE AND ROTARY MACHINE (71) Applicant: Mitsubishi Hitachi Power Systems, Ltd., Kanagawa (JP)

(72) Inventors: Kohei Ozaki, Tokyo (JP); Hidekazu Uehara, Tokyo (JP); Azumi Yoshida, Tokyo (JP); Toyoharu Nishikawa, Tokyo (JP); Eiji Konishi, Tokyo (JP); Shin Nishimoto, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 878 days.

(21) Appl. No.: 16/076,201

(22) PCT Filed: Feb. 16, 2017

(86) PCT No.: PCT/JP2017/005688
§ 371 (c)(1),
(2) Date: Aug. 7, 2018

(87) PCT Pub. No.: WO2017/142011
PCT Pub. Date: Aug. 24, 2017

(65) Prior Publication Data
US 2021/0222577 A1    Jul. 22, 2021

(30) Foreign Application Priority Data
Feb. 16, 2016 (JP) .............................. JP2016-027004

(51) Int. Cl.
*F01D 11/02* (2006.01)
*F01D 5/20* (2006.01)
(Continued)

(52) U.S. Cl.
CPC ................ *F01D 11/02* (2013.01); *F01D 5/20* (2013.01); *F01D 11/122* (2013.01); *F02C 7/28* (2013.01);
(Continued)

(58) Field of Classification Search
CPC .......... F01D 5/20; F01D 11/122; F01D 11/02; F02C 7/28; F16J 15/4472; F16J 15/453
(Continued)

(56) References Cited

U.S. PATENT DOCUMENTS 8,167,547 B2 * 5/2012 Wu ..................... F01D 11/02
415/173.5
8,182,211 B2 * 5/2012 Steiger ................ F01D 11/001
415/173.7
(Continued)

FOREIGN PATENT DOCUMENTS

CN    1573024    2/2005
CN   101765736   6/2010
(Continued)

OTHER PUBLICATIONS

International Search Report dated May 16, 2017 in International (PCT) Application No. PCT/JP2017/005688, with translation.
(Continued)

*Primary Examiner* — Michael L Sehn
(74) *Attorney, Agent, or Firm* — Wenderoth, Lind & Ponack, L.L.P.

(57) ABSTRACT

A sealing device seals a gap between an outer circumferential surface of a rotor and an inner circumferential surface of a stator. The sealing device includes a sealing ring provided on the stator and having a free-cutting material, in which a convex portion and a concave portion are alternately formed in an axial direction, on a surface facing the rotor; a plurality of radial fins protruding radially outward from the outer circumferential surface of the rotor; and oblique fins which obliquely protrude from the outer circumferential surface of the rotor toward both ends of the free-cutting material of the sealing ring in the axial direction from the outside of the both ends.

20 Claims, 4 Drawing Sheets

(51) Int. Cl.
*F01D 11/12* (2006.01)
*F02C 7/28* (2006.01)
*F16J 15/447* (2006.01)
*F16J 15/453* (2006.01)

(52) U.S. Cl.
CPC ...... *F05D 2220/31* (2013.01); *F05D 2240/55* (2013.01); *F05D 2250/314* (2013.01); *F16J 15/4472* (2013.01); *F16J 15/453* (2013.01)

(58) Field of Classification Search
USPC ....................................................... 415/173.4
See application file for complete search history.

(56) References Cited

U.S. PATENT DOCUMENTS

| | | | |
|---|---|---|---|
| 8,240,675 | B2 | 8/2012 | Hirakawa et al. |
| 8,540,479 | B2 * | 9/2013 | Awtar ..................... F01D 11/22 415/113 |
| 2004/0239040 | A1 | 12/2004 | Burdgick |
| 2005/0012275 | A1 | 1/2005 | Nakano et al. |
| 2010/0164179 | A1 | 7/2010 | Hirakawa et al. |
| 2010/0278645 | A1 | 11/2010 | Narita et al. |
| 2011/0309585 | A1 | 12/2011 | Uehara et al. |
| 2012/0014778 | A1 | 1/2012 | Narita et al. |
| 2012/0043728 | A1 | 2/2012 | Zeng et al. |
| 2013/0139386 | A1 | 6/2013 | Lacy et al. |
| 2014/0064909 | A1 * | 3/2014 | Trivedi ................. F01D 11/001 415/1 |
| 2014/0119901 | A1 | 5/2014 | Shibata et al. |
| 2014/0205445 | A1 | 7/2014 | Maekawa et al. |

FOREIGN PATENT DOCUMENTS

| | | |
|---|---|---|
| CN | 101876259 | 11/2010 |
| CN | 102362109 | 2/2012 |
| CN | 203669938 | 6/2014 |
| JP | 2001123803 A * | 5/2001 |
| JP | 2008-223660 | 9/2008 |
| JP | 2011-153570 | 8/2011 |
| JP | 5101317 | 12/2012 |
| JP | 2013-119855 | 6/2013 |
| JP | 2014-141910 | 8/2014 |
| KR | 10-2014-0052864 | 5/2014 |

OTHER PUBLICATIONS

Written Opinion of the International Searching Authority dated May 16, 2017 in International (PCT) Application No. PCT/JP2017/005688, with translation.

* cited by examiner

SEALING DEVICE AND ROTARY MACHINE

BACKGROUND OF THE INVENTION

1. Technical Field

The present invention relates to a sealing device and a rotary machine.

Priority is claimed on Japanese Patent Application No. 2016-027004, filed Feb. 16, 2016, the content of which is incorporated herein by reference.

2. Description of the Related Art

In rotary machines such as steam turbines, gas turbines, axial flow compressors and so on, one cause of pressure loss is leakage of a working fluid such as steam or gas between tip ends of blades and an inner circumferential surface of a stator which is in close proximity to and faces the tip ends. To reduce this loss and to improve turbine efficiency, sealing devices are provided between the tip ends of the blades and the stator. As such sealing devices, for example, there are abradable seals which do not damage any member even when the blades and the stator come into contact with each other.

Japanese Unexamined Patent Application, First Publication No. 2011-153570 discloses sealing devices in which compressor impellers and abradable seals are provided. In these sealing devices, the abradable seals are provided in rounded corner regions facing the compressor impellers. Blades of the compressor impellers are disposed to protrude obliquely with respect to the abradable seals.

SUMMARY OF THE INVENTION

1. Technical Problem

However, in the rotary machine having the sealing devices described in JP 2011-153570, thermal expansion in an axial direction of a rotating shaft or eccentricity in a radial direction of the rotating shaft may occur during an operation thereof. When the thermal expansion or the radial eccentricity occurs, the abradable seals are cut by the blades of the compressor impellers. When the abradable seals are cut in this manner, a gap between the blades and the abradable seals becomes large, and the sealing performance is lowered.

The present invention has been made to solve the above problems, and it is an object of the present invention to provide a sealing device and a rotary machine capable of minimizing deterioration of a sealing property due to thermal expansion in an axial direction and eccentricity in a radial direction.

2. Solution to the Problem

In order to solve the above problem, the present invention proposes the following means.

A sealing device according to a first aspect of the present invention is a sealing device which seal a gap between an outer circumferential surface of a rotor which rotates around an axis and an inner circumferential surface of a stator which covers the outer circumferential surface from an outer circumferential side thereof, including a sealing ring provided on the stator and having a free-cutting material, in which a convex portion and a concave portion are alternately formed in an axial direction, on a surface facing the rotor; a plurality of radial fins protruding radially outward from the outer circumferential surface of the rotor at axial positions corresponding to the convex portion and the concave portion of the free-cutting material of the sealing ring; and oblique fins which obliquely protrude from the outer circumferential surface of the rotor toward both ends of the free-cutting material of the sealing ring in the axial direction from the outside of the both ends.

According to such a constitution, even when the gap between the radial fins and the free-cutting material becomes large due to thermal expansion of the rotor in the axial direction, eccentricity in the radial direction, and so on, it is possible to maintain a distance of the gap between the oblique fin and the free cutting material. Therefore, it is possible to maintain the sealing property between a tip end surface of a blade and an inner circumferential surface of the sealing ring.

In the sealing device according to a second aspect of the present invention, in the first aspect, a thickness of the free-cutting material in the convex portion or the concave portion provided at both ends of the sealing ring in the axial direction may be larger than a thickness of the free-cutting material in the other convex portion or concave portion.

According to such a constitution, it is possible to avoid contact between the sealing ring and the oblique fin having a tip end on the outer circumferential side in the radial direction from a radial position of a tip end of the radial fin. Accordingly, it is possible to avoid breakage of the oblique fin and the sealing ring.

In the sealing device according to a third aspect of the present invention, in the first or second aspect, a surface of the free-cutting material facing the oblique fin may be a curved surface which is convex toward the oblique fin.

According to such a constitution, it is possible to reduce contact resistance when the oblique fin and the free-cutting material come into contact with each other. Therefore, even when the oblique fin comes into contact with the free-cutting material in an extending direction of the oblique fin, the oblique fin can stably cut the free-cutting material and the sealing property can be prevented from deteriorating.

In the sealing device according to a fourth aspect of the present invention, in the first to third aspects, a position of a tip end of the oblique fin in the axial direction may not overlap the sealing ring.

According to such a constitution, when the rotor is eccentric in the radial direction, it is possible to prevent the tip end of the oblique fin from coming into contact with the sealing ring. Therefore, it is possible to avoid breakage of the oblique fin and the sealing ring.

In the sealing device according to a fifth aspect of the present invention, in the first to fourth aspects, a position of a tip end of the oblique fin in a radial direction may be located at a position of the convex portion or the concave portion provided at both ends in the axial direction which overlaps the free-cutting material in the axial direction.

According to such a constitution, even when the rotor thermally expands in the axial direction, the tip end of the oblique fin can come into contact with the free-cutting material, and thus it is possible to maintain the sealing property between the tip end surface of the blade and the inner circumferential surface of the sealing ring.

In the sealing device according to a sixth aspect of the present invention, in the first to fifth aspects, the plurality of oblique fins may be provided, and a sealing member may be disposed between two of the oblique fins which are inclined in a direction not facing the axial direction.

According to such a constitution, the sealing property between the tip end surface of the blade and the inner circumferential surface of the sealing ring can also be maintained in an axial gap between the adjacent sealing rings formed by introducing the oblique fin.

A rotary machine according to a seventh aspect of the present invention includes a rotor which rotates around an axis; a stator which covers the rotor from a radially outer side; and the sealing device according to any one of the first to sixth aspects.

According to such a constitution, it is possible to minimize deterioration of the sealing property in the gap between the outer circumferential surface of the rotor and the inner circumferential surface of the stator, to reduce the leakage loss and to enhance the turbine efficiency.

3. Advantageous Effects of the Invention

According to the present invention, it is possible to minimize deterioration of a sealing property of the sealing device and the rotary machine due to thermal expansion in an axial direction and eccentricity in a radial direction.

DETAILED DESCRIPTION OF EMBODIMENTS OF THE INVENTION

First Embodiment

Hereinafter, a rotary machine according to a first embodiment of the present invention will be described with reference to FIGS. 1 to 6.

Figure 1:
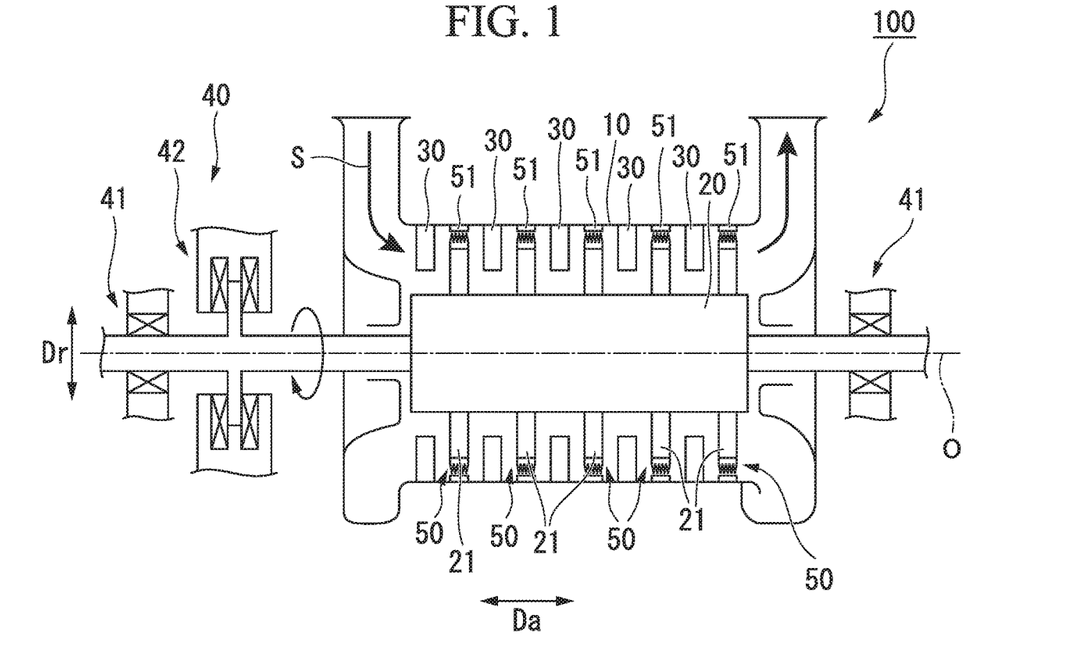
FIG. 1 is a schematic diagram showing the overall constitution of a rotary machine according to a first embodiment of the present invention.

As shown in FIG. 1, a rotary machine of the embodiment is a steam turbine 100. The steam turbine 100 is an external combustion engine which converts energy of steam S into a rotational force and is used for a generator or the like in a power plant. The steam turbine 100 includes a casing 10, a rotor 20, vanes 30, a bearing portion 40, and sealing devices 50. In the specification, a combination of the casing 10 and the vanes 30 is referred to as a stator. A member disposed on a radially outer side of the rotor 20 is the stator, and the casing 10 and the vanes 30 are part of the stator.

In the casing 10, an internal space is hermetically sealed, and a flow path of the steam S is formed inside. The casing 10 covers the rotor 20 from an outer side of the rotor 20 in a radial direction Dr.

As shown in FIG. 1, the rotor 20 extends along an axis O to pass through the casing 10 and rotates around the axis O. Blades 21 are provided on the rotor 20. In the rotor 20, an intermediate portion in which the blades 21 are provided is accommodated inside the casing 10. Both ends of the rotor 20 protrude to an outer side of the casing 10. Both ends of the rotor 20 protruding outward from the casing 10 are rotatably supported by a bearing portion 40.

The plurality of blades 21 are disposed in a circumferential direction of the rotor 20. The plurality of blades 21 are annularly provided on an outer circumferential surface of the rotor 20. The blades 21 receive a pressure of the steam S flowing in the axial direction Da of the rotor 20 and rotate the rotor 20 around the axis O. Tip end surfaces 21a of the blades 21 which are directed outward in the radial direction Dr face inner circumferential surfaces of sealing rings 51 of the sealing devices 50 to be described later, which are directed inward in the radial direction Dr.

The plurality of vanes 30 are provided in the circumferential direction of the rotor 20 on a surface which faces an inner side of the casing 10. The vanes 30 are disposed with an interval from the rotor 20 in the radial direction Dr. The vanes 30 are disposed with an interval from the blades 21 in the axial direction Da.

The bearing portion 40 supports the rotor 20 to be rotatable around the axis O. The bearing portion 40 includes journal bearings 41 provided at both ends of the rotor 20, and a thrust bearing 42 provided at one end side of the rotor 20.

The sealing devices 50 seal a gap between the outer circumferential surface of the rotor 20 which rotates around the axis O and the inner circumferential surface of the stator which covers the outer circumferential surface from the outside in the radial direction Dr of the rotor 20. The sealing devices 50 of the embodiment seal a gap between the tip end surfaces 21a of the blades 21 and the inner circumferential surfaces of the sealing rings 51. The tip end surfaces 21a of the blades 21 correspond to part of the outer circumferential surface of the rotor 20.

Figure 2:
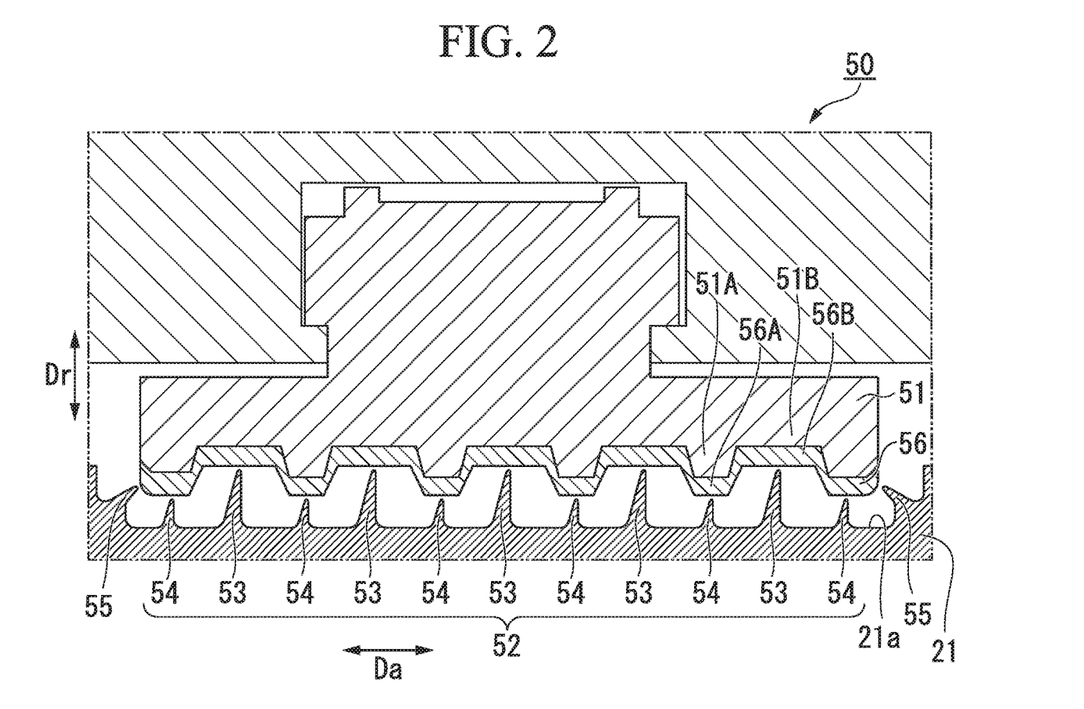
FIG. 2 is a longitudinal cross-sectional view showing a sealing device according to the first embodiment of the present invention.
Figure 3:
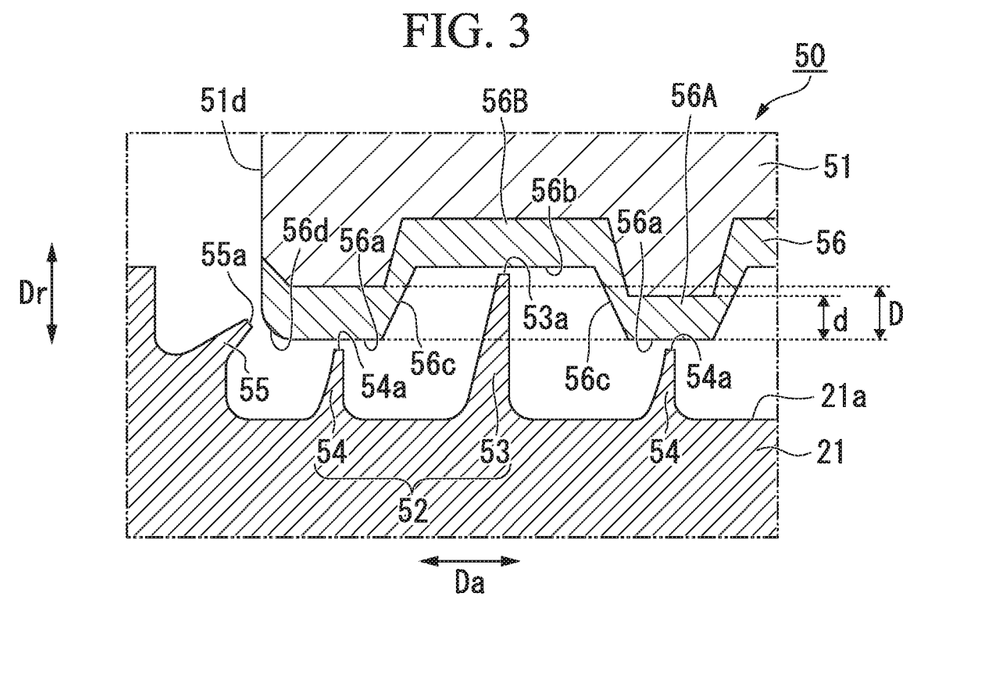
FIG. 3 is an enlarged view of a main part of the sealing device according to the first embodiment of the present invention.

As shown in FIGS. 2 and 3, each sealing device 50 includes the sealing ring 51 having a free-cutting material 56, radial fins 52, and oblique fins 55. That is, the sealing devices 50 of the embodiment are one type of abradable seal. Each radial fins 52 includes elongated long fins 53 and shortened short fins 54.

The sealing rings 51 are ring-shaped members which can be divided in the circumferential direction. The sealing rings 51 cover the outer circumferential surface of the rotor 20 rotating around the axis O from the outside in the radial direction Dr. As shown in FIG. 2, each sealing ring 51 of the embodiment covers the tip end surface 21a of the tip end of one of the blades 21 from the outside in the radial direction Dr. On the inner circumferential surface of each sealing ring 51, a convex portion 51A protruding inward in the radial direction Dr and a concave portion 51B recessed outward in the radial direction Dr are disposed adjacent to each other in the axial direction Da along which the axis O extends. A plurality of convex portions 51A and concave portions 51B are alternatively disposed in the axial direction Da.

The free-cutting material 56 is provided on the inner circumferential surfaces of the sealing rings 51. The free-cutting material 56 is provided to cover the convex portions 51A and the concave portions 51B of the sealing rings 51 and has convex portions 56A according to the convex portions 51A of the sealing rings 51 and concave portions 56B according to the concave portions 51B of the sealing rings 51. The free-cutting material 56 is formed in a layer shape by spraying a material having better machinability than the radial fins 52 and the oblique fins 55 on the inner circumferential surface of the casing 10.

A thickness of the free-cutting material 56 is formed to be constant in principle except for the convex portions 56A or the concave portions 56B provided at both ends of the free-cutting material 56 in the axial direction Da. A thickness D of the convex portions 56A or the concave portions 56B of the free-cutting material 56 provided at both ends in the axial direction Da is formed thicker than a thickness d of the other convex portions 56A and concave portions 56B.

As shown in FIG. 3, the free-cutting material 56 includes short facing surfaces 56a which faces top surfaces 54a of the short fins 54, long facing surfaces 56b which face top surfaces 53a of the long fins 53, inclined surfaces 56c which connect the short facing surfaces 56a with the long facing surfaces 56b, and end surfaces 56d which are connected to both ends of each sealing ring 51.

The short facing surfaces 56a are surfaces, which face inwardly in the radial direction Dr, of the convex portions 56A of the free-cutting material 56. The short facing surfaces 56a are surfaces which connect radially inner side ends of the inclined surfaces 56c adjacent to each other in the axial direction Da. The short facing surfaces 56a are formed at positions at which minute gaps are provided with respect to tip ends of the short fins 54 in the radial direction Dr.

The long facing surfaces 56b are surfaces, which face inwardly in the radial direction Dr, of the concave portions 56B of the free-cutting material 56. The long facing surfaces 56b are surfaces which connect radially outer side ends of the inclined surfaces 56c adjacent to each other in the axial direction Da. The long facing surfaces 56b are formed at positions at which minute gaps are formed with respect to tip ends of the long fins 53 in the radial direction Dr.

The inclined surfaces 56c face the long fins 53 in directions including the axial direction Da. Here, the directions including the axial direction Da are directions which include components in the axial direction Da. The directions including the axial direction Da of the embodiment are directions that are inclined downward with respect to the axial direction Da and the radial direction Dr. The inclined surfaces 56c are surfaces facing side surfaces of the long fins 53 which are surfaces facing the axial direction Da. The inclined surfaces 56c are surfaces which connect the short facing surfaces 56a with the long facing surfaces 56b. The inclined surfaces 56c are inclined away from the side surfaces of the long fins 53 inward from the outside in the radial direction Dr. The inclined surfaces 56c are inclined away from center positions of the long fins 53 in the axial direction Da. That is, the inclined surfaces 56c are inclined so that concave portions of concavo-convex shapes expand inward in the radial direction Dr. Therefore, in the inclined surfaces 56c, pairs of inclined surfaces disposed with the long fins 53 interposed therebetween are inclined in different directions.

The end surfaces 56d are surfaces which are connected to side surfaces 51d of the sealing rings 51 in the axial direction Da from the convex portions 56A or the concave portions 56B of the free-cutting material 56. The end surfaces 56d are convex curved surfaces with respect to tip ends of the oblique fins 55 and are formed at positions at which minute gaps are provided in directions in which the oblique fins 55 extend. Since the end surfaces 56d are convex curved surfaces with respect to the oblique fins 55, the oblique fins 55 come into contact with the end surfaces 56d in a direction orthogonal thereto.

The radial fins 52 protrude outward in the radial direction Dr from the outer circumferential surface of the rotor 20. The radial fins include the long fins 53 and the short fins 54.

The long fins 53 protrude outward in the radial direction Dr from the tip end surfaces 21a of the blades 21 which are the outer circumferential surface of the rotor 20 at positions corresponding to the concave portions 56B in the axial direction Da. The long fins 53 are sealing fins extending in the circumferential direction along the tip end surfaces 21a of the blades 21. The long fins 53 protrude so that the top surfaces 53a of the tip ends which are the surfaces facing the outside in the radial direction Dr have a gap with the free-cutting material 56. The plurality of long fins 53 are disposed to be spaced apart from each other in the axial direction Da. One long fin 53 is disposed between the adjacent short fins 54 to correspond to a position of one concave portion 56B. The long fins 53 are each disposed between two short fins 54 arranged on both sides in the axial direction Da.

The short fins 54 protrude outward in the radial direction Dr from the tip end surfaces 21a of the blades 21 which are the outer circumferential surface of the rotor 20 at positions corresponding to the convex portions 56A in the axial direction Da. The short fins 54 protrude so that the top surfaces 54a of the tip ends which are surfaces facing the outside in the radial direction Dr have a gap with the free-cutting material 56. The short fins 54 are sealing fins extending in the circumferential direction along the tip end surfaces 21a of the blades 21. The plurality of short fins 54 are disposed to be spaced apart from each other in the axial direction Da. The plurality of short fins 54 are disposed at regular intervals in the axial direction Da.

Each of the oblique fins 55 protrudes obliquely from an outer side of the outer circumferential surface of the rotor 20 toward an end of the free-cutting material 56 of the sealing ring 51 in the axial direction Da. That is, a pair of oblique fins 55 are provided to face one sealing ring 51 and are inclined toward both ends of the sealing ring 51 in the axial direction Da. The oblique fins 55 protrude so that tip end surfaces 55a of the oblique fins 55 have gaps with the free-cutting material 56.

Positions of the tip ends of the oblique fins 55 in the radial direction Dr are located closer to the sealing rings 51 than positions of the tip ends of the short fins 54 in the radial direction Dr. Further, the positions of the tip ends of the oblique fins 55 in the radial direction Dr are located at positions overlapping the free-cutting material 56 in the convex portions 56A or the concave portions 56B provided at both axial ends in the axial direction Da. The positions of the tip ends of the oblique fins 55 in the radial direction Dr are located closer to the sealing rings 51 than a radial position of a surface of the free-cutting material 56 on the side of the blades 21 in the convex portions 56A or the concave portions 56B provided at both ends in the axial direction Da and located closer to the side of the blades 21 than the radial position of the surface of the free-cutting material 56 on the side of the sealing rings 51 in the convex portions 56A or the concave portions 56B provided at both ends in the axial direction Da.

As described above, the thickness D of the convex portions 56A or the concave portions 56B of the free-cutting material 56 provided at both ends in the axial direction Da is thicker than the thickness d of the other convex portions 56A and concave portions 56B and is designed so that the oblique fins 55 do not come into contact with the sealing rings 51 even when thermal expansion, eccentricity or the like occurs in the rotor 20.

The positions of the tip ends of the oblique fins 55 in the axial direction Da are positions which do not overlap the positions of the sealing rings 51 in the axial direction Da. That is, the tip ends of the oblique fins 55 are disposed on the axially outer sides of the sealing rings 51 from the side surfaces 51d of the sealing rings 51. Therefore, even when the oblique fins 55 move in the radial direction Dr due to the eccentricity or the like of the rotor 20, it is possible to avoid contact between the tip ends of the oblique fins 55 and the sealing rings 51.

In the sealing devices 50 as described above, pluralities of radial fins 52 provided on the tip end surfaces 21a of the blades 21 and pairs of oblique fins 55 form a minute gap with the free-cutting material 56 covering the inner circumferential surfaces of the sealing rings 51. Therefore, it is possible to seal the gap between the tip end surfaces 21a of the blades 21 and the inner circumferential surfaces of the sealing rings 51 and to minimize leakage from this gap in the axial direction Da.

Further, when the steam turbine 100 is operated, a positional relationship between the rotor 20 and the stator in the axial direction Da may deviate due to the thermal expansion occurring in the rotor 20, or a positional relationship between the rotor 20 and the stator in the radial direction Dr may deviate due to the eccentricity of the rotor 20. In either case, the sealing devices 50 according to the embodiment can ensure high sealing performance. Hereinafter, each of the cases will be specifically described separately.

Figure 4:
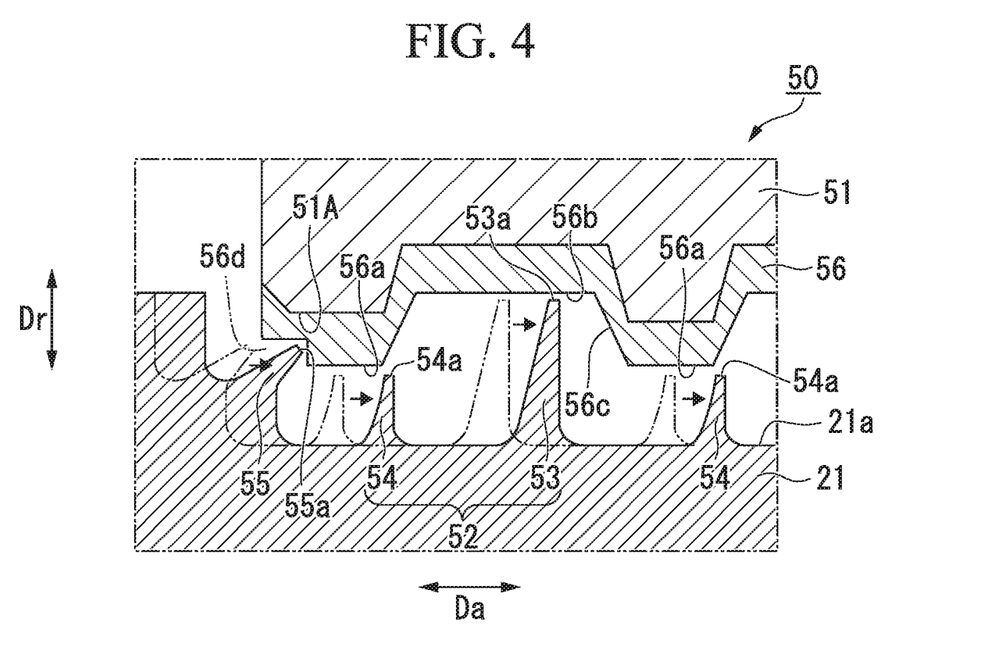
FIG. 4 is an enlarged view of a main part showing a state in which radial fins and oblique fins are moved in an axial direction in the sealing device according to the first embodiment of the present invention.

First, as shown in FIG. 4, when the thermal expansion occurs in the rotor 20, the positions of the radial fins 52 (the long fins 53 and the short fins 54) and the oblique fins 55 in the axial direction Da change. As described above, in the sealing devices 50 of the embodiment, the positions of the tip end surfaces 55a of the tip ends of the oblique fins 55 in the radial direction Dr are disposed between the surfaces of the convex portions 51A facing in the radial direction Dr and the short facing surfaces 56a of the free-cutting material 56. Therefore, when positions of the short fins 54 in the axial direction Da shift to positions which do not overlap the positions of the short facing surfaces 56a in the axial direction Da, the free-cutting material 56 and the oblique fins 55 come into contact with each other. Therefore, even when the positions of the short fins 54 in the axial direction Da deviate greatly from the short facing surfaces 56a, it is possible to prevent the gap between the tip end surfaces 21a of the blades 21 and the sealing rings 51 from becoming large due to the cut free-cutting material 56 and the oblique fins 55. Accordingly, it is possible to minimize deterioration of the sealing performance even when the positions of the short fins 54 deviate due to the thermal expansion.

Further, the end surfaces 56d facing the tip end surfaces 55a of the oblique fins 55 are curved faces which are convex toward the tip end surfaces 55a of the oblique fins 55. Therefore, it is possible to reduce resistance when the oblique fins 55 move in the axial direction Da and come into contact with the end surfaces 56d. Accordingly, when the oblique fins 55 move in the axial direction Da, the free-cutting material 56 can be stably cut by the oblique fins 55. Thus, it is possible to stably minimize an increase in the gap between the oblique fins 55 and the free-cutting material 56 by the oblique fins 55 in contact with the free-cutting material 56.

Figure 5:
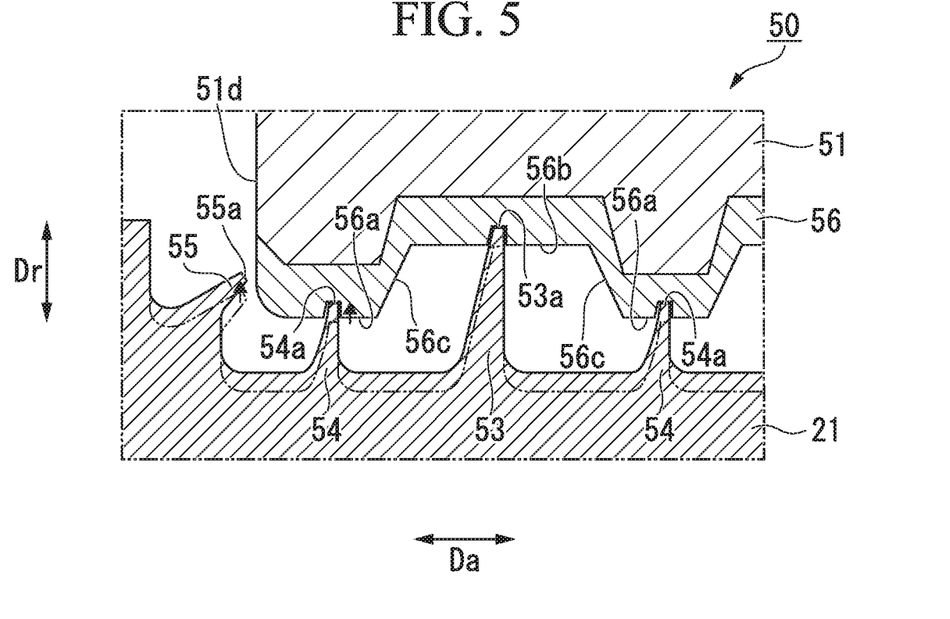
FIG. 5 is an enlarged view of a main part showing a state in which the radial fins and the oblique fins are moved in a radial direction in the sealing device according to the first embodiment of the present invention.

Next, as shown in FIG. 5, when the rotor 20 is eccentric, the positions of the radial fins 52 (the long fins 53 and the short fins 54) and the oblique fins 55 in the radial direction Dr change. The eccentricity of the rotor 20 may occur gradually with continuous rotation or may occur suddenly due to a sudden event. In the sealing devices 50 of the embodiment, the positions of the tip end surfaces 55a of the tip ends of the oblique fins 55 in the axial direction Da are provided at positions which do not overlap the axial direction Da of the sealing rings 51. Therefore, even when the positions of the oblique fins 55 in the radial direction Dr change, they do not come into contact with the sealing rings 51.

In addition, when the positions of the long fins 53 and the short fins 54 in the radial direction Dr change, the long fins 53 and the short fins 54 come into contact with the free-cutting material 56. Therefore, it is possible to prevent the gap between the tip end surfaces 21a of the blades 21 and the sealing rings 51 from becoming large due to the cut free-cutting material 56, the long fins 53 and the short fins 54. Further, even when the positions of the tip end surfaces 55a of the oblique fins 55 in the radial direction change, a distance of the gap between the tip end surfaces 55a of the oblique fins 55 and the free-cutting material 56 does not change. Accordingly, the gap between the oblique fins 55 and the free-cutting material 56 does not increase.

Figure 6:
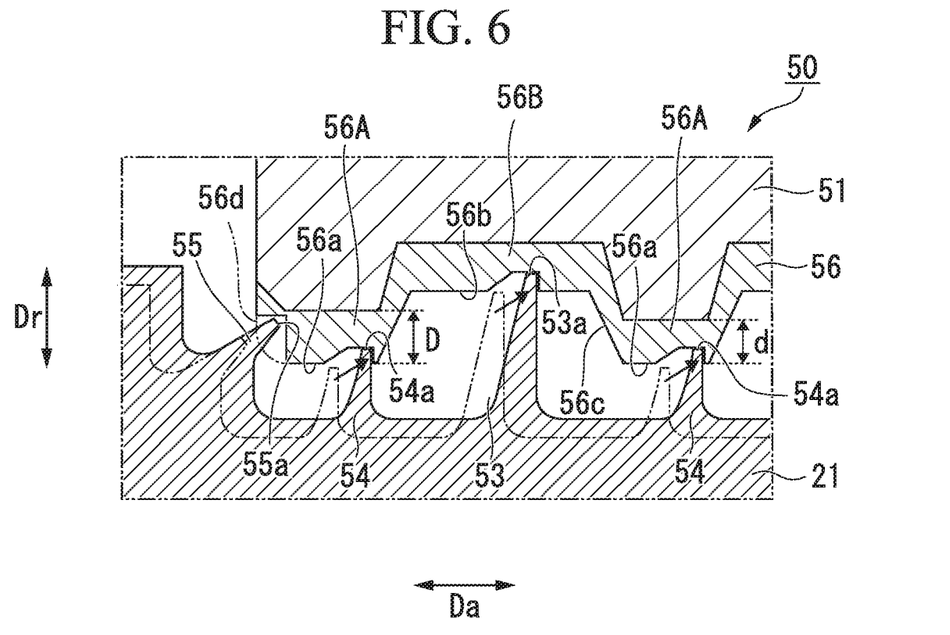
FIG. 6 is an enlarged view of a main part showing a state in which the radial fins and the oblique fins are moved in the axial direction and the radial direction in the sealing device according to the first embodiment of the present invention.

Finally, as shown in FIG. 6, when both the thermal expansion of the rotor 20 and the eccentricity of the rotor 20 occur, the positions of the radial fins 52 (the long fins 53 and the short fins 54) and the oblique fins 55 in the axial direction Da and in the radial direction Dr change. In the sealing devices 50 of the embodiment, the thickness D of the free-cutting material 56 in the convex portions 56A or the concave portions 56B provided at both ends of the sealing ring 51 in the axial direction Da is larger than the thickness d of the free-cutting material 56 in the other convex portions 56A or concave portions 56B. Therefore, even when the free-cutting material 56 is cut by the oblique fins 55 on the outer circumferential side from the positions of the top surfaces 54a of the short fins 54, the positions of the tip end surfaces 55a in the radial direction Dr can prevent the oblique fins 55 and the sealing rings 51 from coming into contact with each other.

In addition, since each of the long fins 53, the short fins 54 and the oblique fins 55 cuts the free-cutting material 56, the gap between each of the top surfaces thereof and the free-cutting material 56 does not increase. Therefore, even when both the thermal expansion of the rotor 20 and the eccentricity of the rotor 20 occur, it is possible to minimize the deterioration of the sealing property.

According to the steam turbine 100 using such a sealing concept, it is possible to minimize the deterioration of the sealing property in the gap between the tip end surfaces 21a of the blades 21 and the inner circumferential surface of the stator and thus to reduce the leakage loss and to improve the turbine efficiency.

Second Embodiment

Next, a sealing device of the second embodiment will be described with reference to FIGS. 7 and 8. In the second embodiment, the same reference numerals are given to the same constituent elements as those of the first embodiment, and detailed description thereof will be omitted. The sealing devices of the second embodiment are different from those of the first embodiment in that there are a plurality of oblique fins and sealing members are disposed between two oblique fins inclined in a direction which does not face the axial direction. That is, this embodiment is different from the first embodiment in that the sealing members are provided between the plurality of sealing rings arranged in the axial direction.

As the sealing members, known members used for preventing leakage of steam in a steam turbine or the like can be used. For example, as the sealing members, sealing rings may be used alone, or labyrinth seals may be used.

Figure 7:
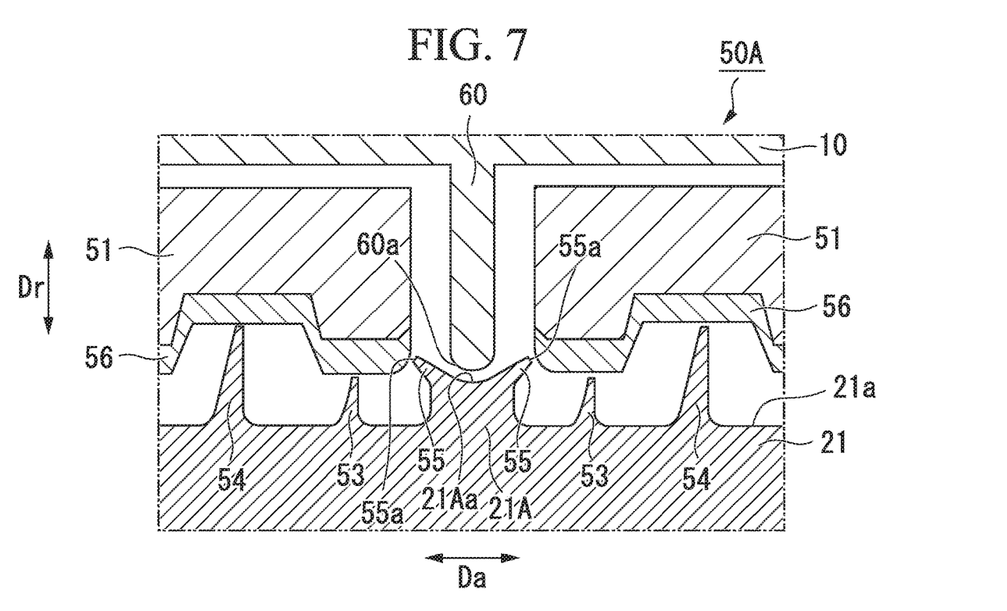
FIG. 7 is an enlarged view of a main part of a sealing device according to a second embodiment of the present invention.

As shown in FIG. 7, in sealing devices 50A of the second embodiment, the oblique fins 55 are formed in protruding portions 21A protruding from the tip end surfaces 21a of the blades 21 to bring radial positions of the tip end surfaces 55a of the oblique fins 55 close to the free-cutting material 56. The protruding portions 21A are provided between adjacent sealing rings 51. That is, the protruding portions 21A are provided between two oblique fins 55 inclined in a direction which does not face the axial direction Da. Therefore, there are gaps between the adjacent sealing rings 51 corresponding to a width of the protruding portions 21A. In the sealing devices 50A of the second embodiment shown in FIG. 7, single sealing rings 60 are provided as sealing members in these gaps. Tip end surfaces 60a of the single sealing rings 60 face top surfaces 21Aa of the protruding portions 21A and are disposed at positions close to the top surfaces 21Aa of the protruding portions 21A.

According to the sealing devices 50A of the second embodiment as described above, it is possible to further minimize the deterioration of the sealing property in the gap between the tip end surfaces 21a of the blade 21 and the inner circumferential surface of the stator by the single sealing rings 60 and the protruding portions 21A. That is, it is possible to reduce the leakage loss of the steam turbine having such sealing devices 50A and to improve the turbine efficiency.

Figure 8:
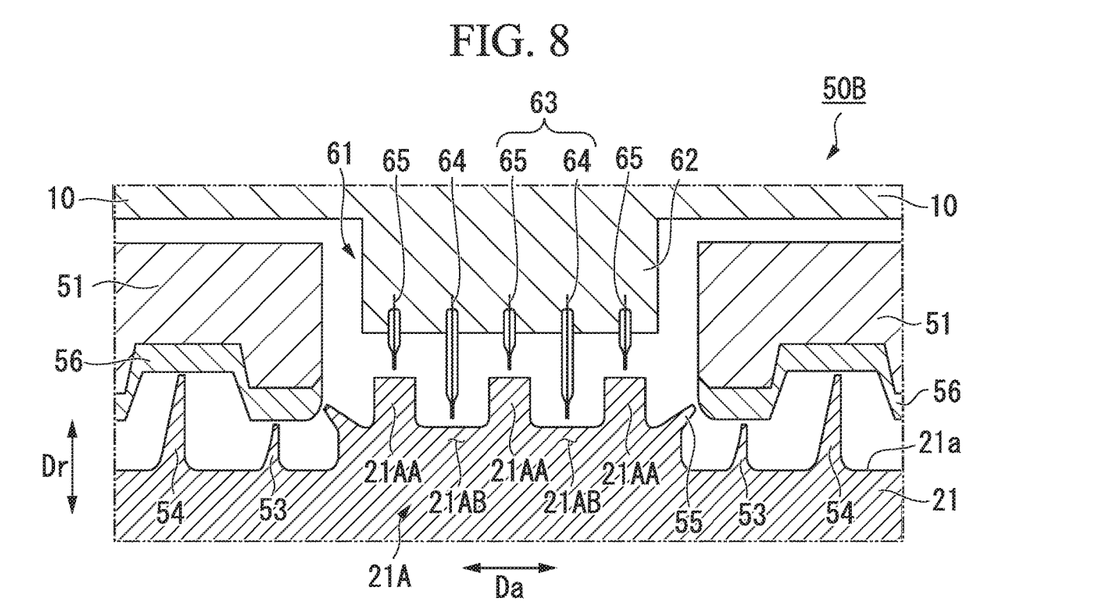
FIG. 8 is an enlarged view of a main part of a modified example of the sealing device according to the second embodiment of the present invention.

As shown in FIG. 8, as a modified example of the sealing devices of the second embodiment, labyrinth seals 61 may be provided in gaps between the adjacent sealing rings 51 in the axial direction Da. The labyrinth seal 61 shown in FIG. 8 has a protruding portion 21A protruding from the blade 21 in an outer circumferential direction, a supporting portion 62 facing the protruding portion 21A, and sealing fins 63 protruding from the supporting portion 62 toward the protruding portion 21A. On a top surface of the protruding portion 21A, convex portions 21AA and concave portions 21AB form a concavo-convex shape. The sealing fins 63 include long sealing fins 64 provided at positions corresponding to the concave portions 21AB of the protruding portion 21A in the axial direction Da, and short sealing fins 65 provided at positions corresponding to the convex portions 21AA of the protruding portion 21A in the axial direction Da. Positions of tip ends of the sealing fins 63 in the radial direction Dr are located at positions spaced apart from the top surface 21Aa of the protruding portion 21A.

According to the sealing device 50A of the second embodiment as described above, the sealing fins 63 and the protruding portions 21A can further minimize the deterioration of the sealing property in the gap between the tip end surfaces 21a of the blades 21 and the inner circumferential surface of the stator. Further, since a cross sectional shape of a flow path of the steam is a meandering comb shape due to the convex portions 21AA and the concave portions 21AB of the protruding portions 21A and the long sealing fins 64 and the short sealing fins 65 constituting the sealing fins 63, the leakage of the steam can be further prevented.

Although embodiments of the present invention have been described in detail with reference to the drawings, the respective constitutions and combinations thereof in each embodiment are examples, and additions, omissions, substitutions, and other changes to the constitution are possible without departing from the spirit of the present invention. Further, the present invention is not limited to the embodiments but is limited only by the claims.

The sealing devices 50 are not limited to the steam turbine 100. The sealing devices 50 can be applied to, for example, a rotary machine such as a gas turbine or a compressor.

Further, in the embodiment, the free-cutting material 56 has the inclined surfaces 56c inclined to be away from the side surfaces of the long fins 53, but the present invention is not limited thereto. For example, the surfaces connecting the short facing surfaces 56a with the long facing surfaces 56b do not have to be inclined and may be surfaces perpendicular to the tip end surfaces 21a of the blades 21.

Further, in the embodiment, the convex portions 55A and the concave portions 56B of the free-cutting material 56 are provided to reflect the convex portions 51A and the concave portions 51B of the sealing rings 51, but the inner circumferential surfaces of the sealing rings 51 may be flat surfaces, and the convex portions 56A and the concave portions 56B of the free-cutting material 56 may be provided on the flat surfaces by thermal spraying.

According to the present invention, it is possible to minimize the deterioration of the sealing property of the sealing device and the rotary machine due to the thermal expansion in the axial direction and the eccentricity in the radial direction.

REFERENCE CHARACTERS LIST

100 Steam turbine
Da Axial direction
Dr Radial direction
S Steam
O Axis
10 Casing
20 Rotor
21 Blade
21a Tip end surface
21A Protruding portion
30 Vane
40 Bearing portion
41 Journal bearing
42 Thrust bearing
50, 50A, 50B Sealing device
51 Sealing ring
51A, 56A, 21AA Convex portion
51B, 56B, 21AB Concave portion
51d Side surface
52 Radial fin
53 Long fin
54 Short fin
55 Oblique fin
56 Free-cutting material
56a Short facing surface
56b Long facing surface
56c Inclined surface
56d End surface
60 Single sealing ring
61 Labyrinth seal
62 Supporting portion
63 Sealing fin
64 Long sealing fin
65 Short sealing fin

The invention claimed is:

1. A sealing device which seals a gap between an outer circumferential surface of a rotor which rotates around an axis and an inner circumferential surface of a stator which covers the outer circumferential surface from an outer circumferential side thereof, the sealing device comprising:

a sealing ring provided on the stator and having a free-cutting material, in which convex portions and concave portions are alternately formed in an axial direction, on a surface facing the rotor;

a plurality of radial fins protruding radially outward from the outer circumferential surface of the rotor at axial positions corresponding to the convex portions and the concave portions of the free-cutting material of the sealing ring; and a plurality of oblique fins which obliquely protrude from the outer circumferential surface of the rotor toward ends of the free-cutting material of the sealing ring in the axial direction, each of the plurality of oblique fins protruding from outside of the free-cutting material toward a side surface of the sealing ring in the axial direction when the sealing ring is viewed from the side.

2. The sealing device according to claim 1, wherein a thickness of the free-cutting material in the convex portion or the concave portion provided at both ends of the sealing ring in the axial direction is larger than a thickness of the free-cutting material in the other convex portion or the other concave portion.

3. The sealing device according to claim 2, wherein a surface of the free-cutting material facing each of the plurality of oblique fins is a curved surface which is convex toward the respective oblique fin.

4. The sealing device according to claim 3, wherein a position of a tip end of each of the plurality of oblique fins in the axial direction does not overlap the sealing ring.

5. The sealing device according to claim 3, wherein a position of a tip end of each of the plurality of oblique fins in a radial direction is located at a position of the convex portion or the concave portion provided at both ends in the axial direction which overlaps the free-cutting material in the radial direction.

6. The sealing device according to claim 3, wherein the sealing ring comprises:

a plurality of sealing rings; and a sealing member provided between two sealing rings of the plurality of sealing rings, wherein the sealing member comprises a sealing ring or a labyrinth seal, and wherein the sealing member is disposed between two oblique fins of the plurality of oblique fins which are inclined so as not to face each other in the axial direction.

7. A rotary machine comprising:

the rotor which rotates around an axis;

the stator which covers the rotor from a radially outer side; and the sealing device according to claim 3.

8. The sealing device according to claim 2, wherein a position of a tip end of each of the plurality of oblique fins in the axial direction does not overlap the sealing ring.

9. The sealing device according to claim 2, wherein a position of a tip end of each of the plurality of oblique fins in a radial direction is located at a position of the convex portion or the concave portion provided at both ends in the axial direction which overlaps the free-cutting material in the radial direction.

10. The sealing device according to claim 2, wherein the sealing ring comprises:

a plurality of sealing rings; and a sealing member provided between two sealing rings of the plurality of sealing rings, wherein the sealing member comprises a sealing ring or a labyrinth seal, and wherein the sealing member is disposed between two oblique fins of the plurality of oblique fins which are inclined so as not to face each other in the axial direction.

11. A rotary machine comprising:

the rotor which rotates around an axis;

the stator which covers the rotor from a radially outer side; and the sealing device according to claim 2.

12. The sealing device according to claim 1, wherein a surface of the free-cutting material facing each of the plurality of oblique fins is a curved surface which is convex toward the respective oblique fin.

13. The sealing device according to claim 12, wherein a position of a tip end of each of the plurality of oblique fins in the axial direction does not overlap the sealing ring.

14. The sealing device according to claim 12, wherein a position of a tip end of each of the plurality of oblique fins in a radial direction is located at a position of the convex portion or the concave portion provided at both ends in the axial direction which overlaps the free-cutting material in the radial direction.

15. The sealing device according to claim 12, wherein the sealing ring comprises:

a plurality of sealing rings; and a sealing member provided between two sealing rings of the plurality of sealing rings, wherein the sealing member comprises a sealing ring or a labyrinth seal, and wherein the sealing member is disposed between two oblique fins of the plurality of oblique fins which are inclined so as not to face each other in the axial direction.

16. A rotary machine comprising:

the rotor which rotates around an axis;

the rotor which covers the rotor from a radially outer side; and the sealing device according to claim 12.

17. The sealing device according to claim 1, wherein a position of a tip end of each of the plurality of oblique fins in the axial direction does not overlap the sealing ring.

18. The sealing device according to claim 1, wherein a position of a tip end of each of the plurality of oblique fins in a radial direction is located at a position of the convex portion or the concave portion provided at both ends in the axial direction which overlaps the free-cutting material in the radial direction.

19. The sealing device according to claim 1, wherein the sealing ring comprises:

a plurality of sealing rings; and a sealing member provided between two sealing rings of the plurality of sealing rings, wherein the sealing member comprises a sealing ring or a labyrinth seal, wherein the sealing member is disposed between two oblique fins of the plurality of oblique fins which are inclined so as not to face each other in the axial direction.

20. A rotary machine comprising:

the rotor which rotates around an axis;

the stator which covers the rotor from a radially outer side; and the sealing device according to claim 1.

* * * * *